(12) United States Patent
Mori et al.

(10) Patent No.: US 8,965,769 B2
(45) Date of Patent: Feb. 24, 2015

(54) MARKUP ASSISTANCE APPARATUS, METHOD AND PROGRAM

(71) Applicants: Kouichirou Mori, Saitama (JP); Masahiro Morita, Yokohama (JP)

(72) Inventors: Kouichirou Mori, Saitama (JP); Masahiro Morita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 13/625,138

(22) Filed: Sep. 24, 2012

(65) Prior Publication Data
US 2013/0080175 A1 Mar. 28, 2013

(30) Foreign Application Priority Data

Sep. 26, 2011 (JP) .................................. 2011-209849

(51) Int. Cl.
| | |
|---|---|
| *G10L 13/00* | (2006.01) |
| *G10L 13/08* | (2013.01) |
| *G10L 13/04* | (2013.01) |
| *G06F 17/21* | (2006.01) |
| *G10L 25/63* | (2013.01) |
| *G10L 13/10* | (2013.01) |

(52) U.S. Cl.
CPC .............. *G10L 13/04* (2013.01); *G06F 17/218* (2013.01); *G10L 25/63* (2013.01); *G10L 13/10* (2013.01)
USPC ............................ 704/260; 704/258; 704/270

(58) Field of Classification Search
USPC .................................................. 704/258–275
See application file for complete search history.

(56) References Cited

U.S. PATENT DOCUMENTS

| | | | | |
|---|---|---|---|---|
| 7,062,437 | B2 * | 6/2006 | Kovales et al. | 704/260 |
| 7,487,093 | B2 * | 2/2009 | Mutsuno et al. | 704/266 |
| 8,095,366 | B2 * | 1/2012 | Johnson et al. | 704/270 |
| 2003/0009338 | A1 * | 1/2003 | Kochanski et al. | 704/260 |
| 2005/0096909 | A1 * | 5/2005 | Bakis et al. | 704/260 |
| 2009/0106195 | A1 | 4/2009 | Tateno | |
| 2011/0202530 | A1 | 8/2011 | Saito | |

FOREIGN PATENT DOCUMENTS

| | | |
|---|---|---|
| CN | 101116073 | 1/2008 |
| CN | 102163208 | 8/2011 |
| JP | 2002-245068 | 8/2002 |

OTHER PUBLICATIONS

Suzuki et al, Document Structure Analysis for Expressive e-Book Reading, pp. 32-35, Toshiba Review 66(9), 2011.
Valitutti et al, Evaluation of Unsupervised Emotion Models to Texual Affect Recognition, Proceedings of the NAACL HLT 2010 Workshop on Computational Approaches to Analysis and Generation of Emotion in Text, pp. 62-70, 2010.

(Continued)

*Primary Examiner* — Jesse Pullias
(74) *Attorney, Agent, or Firm* — Amin, Turocy & Watson, LLP

(57) ABSTRACT

According to one embodiment, a markup assistance apparatus includes an acquisition unit, a first calculation unit, a detection unit and a presentation unit. The acquisition unit acquires a feature amount for respective tags, each of the tags being used to control text-to-speech processing of a markup text. The first calculation unit calculates, for respective character strings, a variance of feature amounts of the tags which are assigned to the character string in a markup text. The detection unit detects a first character string assigned a first tag having the variance not less than a first threshold value as a first candidate including the tag to be corrected. The presentation unit presents the first candidate.

18 Claims, 11 Drawing Sheets

(56) References Cited

OTHER PUBLICATIONS

Tachibana et al, Speech Synthesis with Various Emotional Expressions and Speaking Styles by Style Interpolation and Morphing, IEICE Transactions on Information and Systems E88-D(11), pp. 2484-2491, Nov. 1, 2005.

Notification of the First Office Action for Chinese Patent Application No. 201210364039.2 Dated Dec. 3, 2014, 12 pages.

* cited by examiner

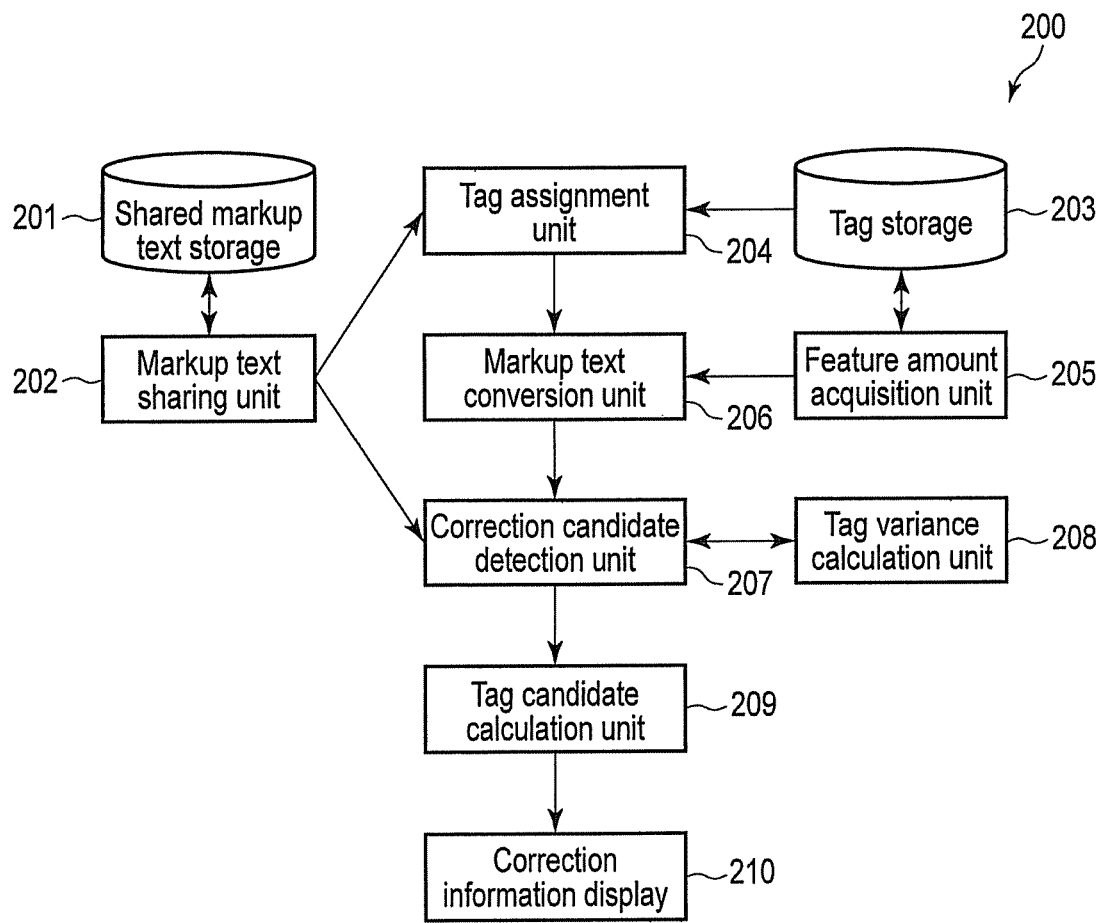
F I G. 2

FIG. 3

| ID | Default | User A | User B | User C | Sentence |
|---|---|---|---|---|---|
| 1 | Ease | Ease | Ease | Ease | Hey! Suzuki! How did you do in the mock exam? |
| 2 | Sorrow | Shame | Anger | Shame | I really screwed up in math and chemistry. |
| 3 | Ease | Ease | Ease | Ease | Aren't you planning on studying to be a pharmacist? |
| 4 | Anger | Hate | Hate | Hate | My parents want me to apply to national universities. |
| 5 | Anger | Hate | Hate | Hate | How on earth can you get into a national university with grades like yours? |
| 6 | Ease | Ease | Ease | Ease | You'll pass the entrance exam on your first try because you're smart. |
| 7 | Anger | Happy | Shame | Anger | Are you kidding? |
| 8 | Fear | Excited | Excited | Fear | One of the seniors got terrible results in the national center test last year, and decided to spend a year studying for the next entrance exams. |
| 9 | Hate | Hate | Hate | Hate | If I'd been more active in the student council I could have got in on a recommendation. |
| 10 | Ease | Excited | Ease | Excited | Speaking of which, apparently the president of the student council got a recommendation. |
| 11 | amazed | Hate | amazed | Hate | Really? People like that are savvy about that kind of thing. |
| 12 | Hate | Hate | Hate | Hate | Too late for that now, though. |
| 13 | Ease | Fear | Hate | Fear | We'll just have to hope we've got what it takes. |
| 14 | Sorrow | Sorrow | Sorrow | Sorrow | That's the problem. |
| 15 | Sorrow | Sorrow | Hate | Ease | Actually, I don't really want to go to college. |
| 16 | amazed | amazed | amazed | amazed | No? Why not?! |
| 17 | Hate | Hate | Hate | Hate | I've always wanted to be a chef. |
| 18 | Ease | Ease | Ease | Ease | It's a good job whatever country you live in. |
| 19 | Sorrow | Sorrow | Sorrow | Sorrow | But my folks aren't interested in what I think. |
| 20 | Sorrow | Sorrow | Sorrow | Sorrow | Do you think we'll feel better once the exam is over? |
| 21 | Ease | Ease | Ease | Ease | Yeah, don't sweat it. |
| 22 | Like | Like | Like | Ease | You'll be OK. |
| 23 | Happy | Like | Like | Happy | Let's goof off and enjoy ourselves once we get into college. |
| 24 | Ease | Ease | Ease | Ease | Good idea! |

FIG. 7

| ID | Default | User A | User B | User C | Variance | Sentence |
|---|---|---|---|---|---|---|
| 1 | (0.9,-0.1) | (0.9,-0.1) | (0.9,-0.1) | (0.9,-0.1) | 0.00 | Hey! Suzuki! How did you do in the mock exam? |
| 2 | (-0.9,-0.2) | (-1.0,-0.1) | (-0.5,0.5) | (-1.0,-0.1) | 0.16 | I really screwed up in math and chemistry. |
| 3 | (0.9,-0.1) | (0.9,-0.1) | (0.9,-0.1) | (0.9,-0.1) | 0.00 | Aren't you planning on studying to be a pharmacist? |
| 4 | (-0.9,0.1) | (-0.9,0.1) | (-0.9,0.1) | (-0.9,0.1) | 0.08 | My parents want me to apply to national universities. |
| 5 | (-0.5,0.5) | (-0.9,0.1) | (-0.9,0.1) | (-0.9,0.1) | 0.08 | How on earth can you get into a national university with grades like yours? |
| 6 | (0.9,-0.1) | (0.9,-0.1) | (0.9,-0.1) | (0.9,-0.1) | 0.00 | You'll pass the entrance exam on your first try because you're smart. |
| 7 | (-0.5,0.5) | (0.9,0.2) | (-1.0,-0.1) | (-0.5,0.5) | 0.75 | Are you kidding? |
| 8 | (-0.9,0.8) | (0.2,0.9) | (0.2,0.9) | (-0.9,0.8) | 0.41 | One of the seniors got terrible results in the national center test last year, and decided to spend a year studying for the next entrance exams. |
| 9 | (-0.9,0.1) | (-0.9,0.1) | (-0.9,0.1) | (-0.9,0.1) | 0.00 | If I'd been more active in the student council I could have got in on a recommendation. |
| 10 | (0.9,-0.1) | (0.2,0.9) | (0.9,-0.1) | (0.2,0.9) | 0.50 | Speaking of which, apparently the president of the student council got a recommendation. |
| 11 | (0.3,0.8) | (-0.9,0.1) | (0.3,0.8) | (-0.9,0.1) | 0.64 | Really? People like that are savvy about that kind of thing. |
| 12 | (-0.9,0.1) | (-0.9,0.1) | (-0.9,0.1) | (-0.9,0.1) | 0.00 | Too late for that now, though. |
| 13 | (0.9,-0.1) | (-0.9,0.8) | (-0.9,0.1) | (-0.9,0.8) | 1.03 | We'll just have to hope we've got what it takes. |
| 14 | (-0.9,-0.2) | (-0.9,-0.2) | (-0.9,-0.2) | (-0.9,-0.2) | 0.00 | That's the problem. |
| 15 | (-0.9,-0.2) | (-0.9,-0.2) | (-0.9,-0.2) | (-0.9,-0.1) | 0.83 | Actually, I don't really want to go to college. |
| 16 | (0.3,0.8) | (0.3,0.8) | (0.3,0.8) | (0.3,0.8) | 0.00 | No? Why not?! |
| 17 | (-0.9,0.1) | (-0.9,0.1) | (-0.9,0.1) | (-0.9,0.1) | 0.00 | I've always wanted to be a chef. |
| 18 | (0.9,-0.1) | (0.9,-0.1) | (0.9,-0.1) | (0.9,-0.1) | 0.00 | It's a good job whatever country you live in. |
| 19 | (-0.9,-0.2) | (-0.9,-0.2) | (-0.9,-0.2) | (-0.9,-0.2) | 0.00 | But my folks aren't interested in what I think. |
| 20 | (-0.9,-0.2) | (-0.9,-0.2) | (-0.9,-0.2) | (-0.9,-0.2) | 0.00 | Do you think we'll feel better once the exam is over? |
| 21 | (0.9,-0.1) | (0.9,-0.1) | (0.9,-0.1) | (0.9,-0.1) | 0.00 | Yeah, don't sweat it. |
| 22 | (1.0,0.1) | (1.0,0.1) | (1.0,0.1) | (0.9,0.1) | 0.01 | You'll be OK. |
| 23 | (0.9,0.2) | (1.0,0.1) | (1.0,0.1) | (0.9,0.2) | 0.01 | Let's goof off and enjoy ourselves once we get into college. |
| 24 | (0.9,-0.1) | (0.9,-0.1) | (0.9,-0.1) | (0.9,-0.1) | 0.00 | Good idea! |

FIG. 11

| ID | Default | User A | User B | User C | New user | Variance | Sentence |
|---|---|---|---|---|---|---|---|
| 1 | (0.9,-0.1) | (0.9,-0.1) | (0.9,-0.1) | (0.9,-0.1) | | 0.00 | Hey! Suzuki! How did you do in the mock exam? |
| 2 | (-0.9,-0.2) | (-1.0,-0.1) | (-0.5,0.5) | (-1.0,-0.1) | | 0.16 | I really screwed up in math and chemistry. |
| 3 | (0.9,-0.1) | (0.9,-0.1) | (0.9,-0.1) | (0.9,-0.1) | | 0.00 | Aren't you planning on studying to be a pharmacist? |
| 4 | (-0.5,0.5) | (-0.9,0.1) | (-0.9,0.1) | (-0.9,0.1) | | 0.08 | My parents want me to apply to national universities. |
| 5 | (-0.5,0.5) | (-0.9,0.1) | (-0.9,0.1) | (-0.9,0.1) | | 0.08 | How on earth can you get into a national university with grades like yours? |
| 6 | (0.9,-0.1) | (0.9,-0.1) | (0.9,-0.1) | (0.9,-0.1) | | 0.00 | You'll pass the entrance exam on your first try because you're smart. |
| 7 | (-0.5,0.5) | (0.9,0.2) | (-1.0,-0.1) | (-0.5,0.5) | (0.9,0.2) | 0.75 | Are you kidding? |
| 8 | (-0.9,0.8) | (0.2,0.9) | (0.2,0.9) | (-0.9,0.8) | (0.2,0.9) | 0.41 | One of the seniors got terrible results in the national center test last year, and decided to spend a year studying for the next entrance exams. |
| 9 | (-0.9,0.1) | (-0.9,0.1) | (-0.9,0.1) | (-0.9,0.1) | | 0.00 | If I'd been more active in the student council I could have got in on a recommendation. |
| 10 | (0.9,-0.1) | (0.2,0.9) | (0.9,-0.1) | (0.2,0.9) | (-0.9,0.1) | 0.50 | Speaking of which, apparently the president of the student council got a recommendation. |
| 11 | (0.3,0.8) | (-0.9,0.1) | (0.3,0.8) | (-0.9,0.1) | (-0.9,0.1) | 0.64 | Really? People like that are savvy about that kind of thing. |
| 12 | (-0.9,0.1) | (-0.9,0.1) | (-0.9,0.1) | (-0.9,0.1) | | 0.00 | Too late for that now, though. |
| 13 | (0.9,0.1) | (-0.9,0.8) | (-0.9,0.1) | (-0.9,0.8) | (-0.9,0.8) | 1.03 | We'll just have to hope we've got what it takes. |
| 14 | (-0.9,-0.2) | (-0.9,-0.2) | (-0.9,-0.2) | (-0.9,-0.2) | | 0.00 | That's the problem. |
| 15 | (-0.9,-0.1) | (-0.9,-0.1) | (-0.9,-0.1) | (0.9,-0.1) | ? | 0.83 | Actually, I don't really want to go to college. |
| 16 | (0.3,0.8) | (0.3,0.8) | (0.3,0.8) | (0.3,0.8) | | 0.00 | No? Why not?! |
| 17 | (-0.9,0.1) | (-0.9,0.1) | (-0.9,0.1) | (-0.9,0.1) | | 0.00 | I've always wanted to be a chef. |
| 18 | (0.9,-0.1) | (0.9,-0.1) | (0.9,-0.1) | (0.9,-0.1) | | 0.00 | It's a good job whatever country you live in. |
| 19 | (-0.9,-0.2) | (-0.9,-0.2) | (-0.9,-0.2) | (-0.9,-0.2) | | 0.00 | But my folks aren't interested in what I think. |
| 20 | (-0.9,-0.2) | (-0.9,-0.2) | (-0.9,-0.2) | (-0.9,-0.2) | | 0.00 | Do you think we'll feel better once the exam is over? |
| 21 | (0.9,0.1) | (0.9,0.1) | (0.9,0.1) | (0.9,0.1) | | 0.00 | Yeah, don't sweat it. |
| 22 | (1.0,0.1) | (1.0,0.1) | (1.0,0.1) | (0.9,0.1) | | 0.01 | You'll be OK. |
| 23 | (0.9,0.2) | (0.9,0.2) | (1.0,0.1) | (0.9,0.2) | | 0.01 | Let's goof off and enjoy ourselves once we get into college. |
| 24 | (0.9,-0.1) | (0.9,-0.1) | (0.9,-0.1) | (0.9,-0.1) | | 0.00 | Good idea! |

| Sentence ID | New user | Default | User A | User B | User C |
|---|---|---|---|---|---|
| 7 | (0.9,0.2) | (-0.5,0.5) | (0.9,0.2) | (-1.0,-0.1) | (-0.5,0.5) |
| 8 | (0.2,0.9) | (-0.9,0.8) | (0.2,0.9) | (0.2,0.9) | (-0.9,0.8) |
| 10 | (-0.9,0.1) | (0.9,-0.1) | (0.2,0.9) | (0.9,-0.1) | (0.2,0.9) |
| 11 | (-0.9,0.1) | (0.3,0.8) | (-0.9,0.1) | (0.3,0.8) | (-0.9,0.1) |
| 13 | (-0.9,0.8) | (0.9,-0.1) | (-0.9,0.8) | (-0.9,0.1) | (-0.9,0.8) |
| User distance | — | 7.749101 | 1.360147 | 5.82386 | 3.896465 |

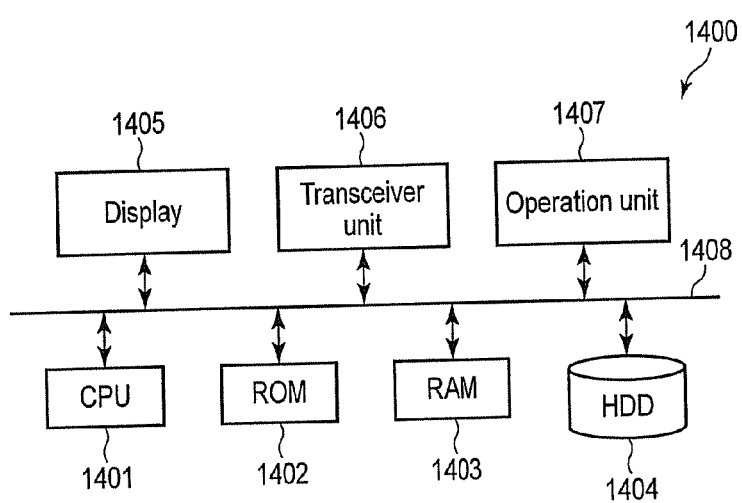
F I G. 14

MARKUP ASSISTANCE APPARATUS, METHOD AND PROGRAM

CROSS-REFERENCE TO RELATED APPLICATIONS

This application is based upon and claims the benefit of priority from Japanese Patent Application No. 2011-209849, filed Sep. 26, 2011, the entire contents of which are incorporated herein by reference.

FIELD

Embodiments described herein relate generally to a markup assistance apparatus, method and program.

BACKGROUND

It is difficult to manually mark up entire large-scale, non-structured text data item such as an electronic book. Using a machine learning technique, markup processing can be automated. However, it is difficult to execute automatic markup processing without any errors. Especially, tags (prosody, emotions, speakers, and the like) used in text-to-speech control are normally different for respective users, and there is no only correct answer. Hence, since judgments fluctuate depending on subjective views and preferences of users, the load on markup processing becomes heavier.

BRIEF DESCRIPTION OF THE DRAWINGS

FIG. 2 is a block diagram illustrating a markup assistance apparatus according to an embodiment;

FIG. 3 is a table illustrating an example of shared markup text data item stored in a shared markup text storage;

FIG. 7 is a table illustrating an example of the shared markup text data item after variance calculations;

FIG. 11 is a table illustrating an example of the shared markup text data item when a new user assigns tags;

FIG. 14 is a block diagram illustrating the hardware arrangement of a management server and user terminal.

DETAILED DESCRIPTION

Figure 1:
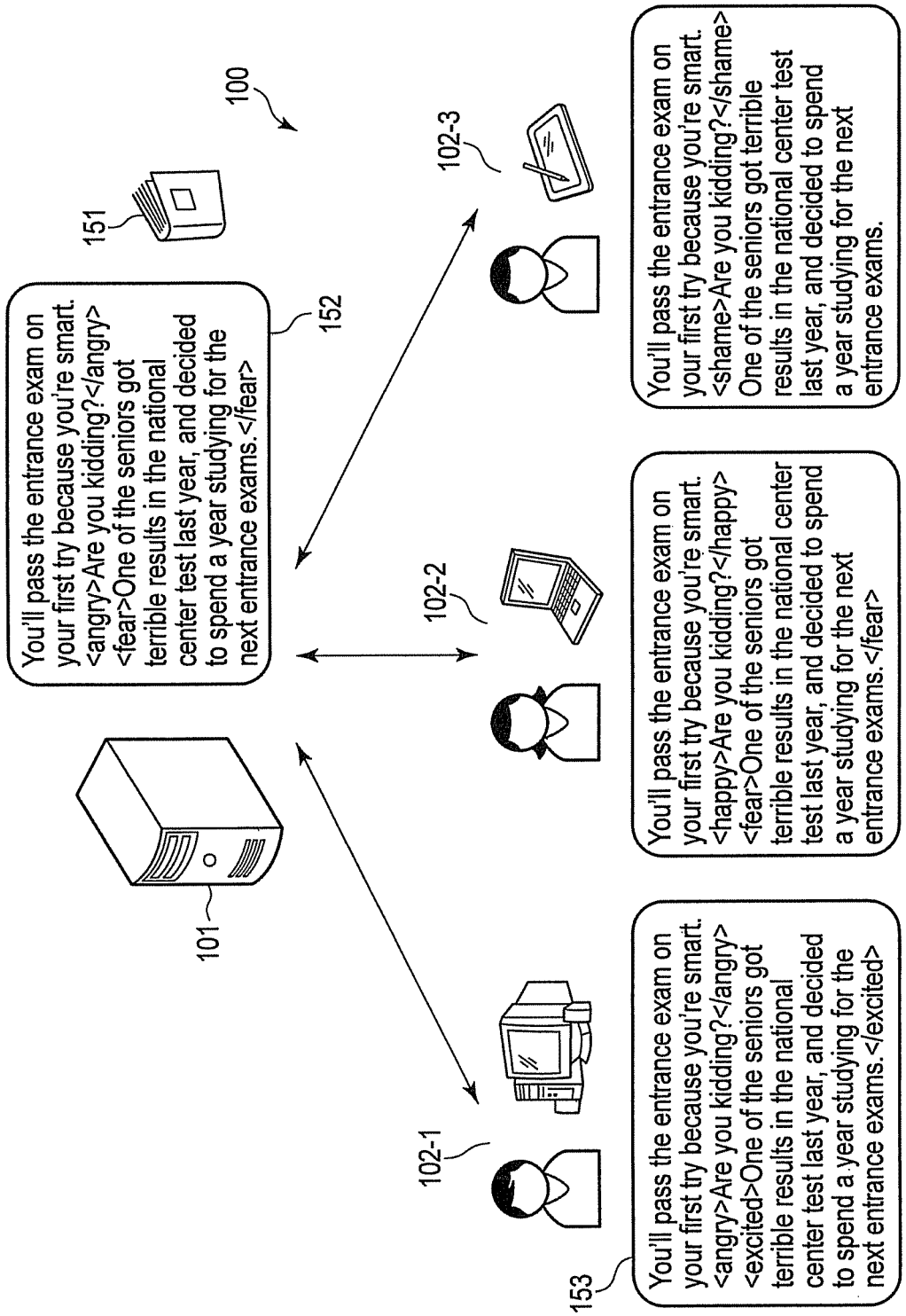
FIG. 1 is a schematic view illustrating an electronic book reading service system.

In automatic text-to-speech processing of a document, a pitch, speech rate, volume, and the like at the time of reading can be adjusted by marking up text data item using a Speech Synthesis Markup Language (SSML). In this case, markup processing means to partially enclose text data item by character strings called tags. The tags are symbols including character strings used to attain text-to-speech control of a pitch, speech rate, volume, utterance style, emotion, speaker, and the like of sentences, which are defined by the markup language represented by SSML. For example, in a markup result [You'll pass the entrance exam on your first try because you're <emphasis>smart</emphasis>.], a part [smart] enclosed by an <emphasis> tag is read with an emphasis. Note that a character string enclosed by a tag is not limited to a word, but may be a character string such as, phrase, and sentence. The following description of this embodiment will be given under the assumption that a tag is assigned to [sentence] as a basic unit to which a tag is to be assigned.

Furthermore, SSML has a function of reading a marked-up part while changing its utterance style such as a conversation style, warning style, or the like, a function of reading a marked-up part with emotion (delight, anger, sorrow, and pleasure), and a function of reading a marked-up part while changing a speaker (voice). With these functions, since sentences can be read much alive, an attempt is made to apply to automatic reading of synthetic speech.

As a markup assistance method, for example, a technique for learning models by a machine learning method from learning corpus prepared by manually and partially marking up text data item, and automatically marking up unknown text data item is generally known. More specifically, an emotion estimation technique for estimating emotions from text data item, and automatically assigning emotion tags is known. In addition to the markup processing of text-to-speech, part-of-speech markup processing for marking up a part-of-speech of each word, structure markup processing for marking up a text structure such as a caption, body text, ads, and the like, and so forth are known. Also, a technique for assisting structure markup processing based on text substances and similarities of layouts is known. However, with the aforementioned related arts, efforts are required to manually mark up text data item. Conversely, automatic markup processing cannot mark up text data item according to subjective views and preferences of users.

In general, according to one embodiment, a markup assistance apparatus includes an acquisition unit, a first calculation unit, a detection unit and a presentation unit. The acquisition unit is configured to acquire feature amount for respective tags, each of the tags being used to control text-to-speech processing of a markup text, the markup text including character strings assigned at least one of the tags, the feature amount being a value used to define a first similarity which indicates a degree of similarity between tags. The first calculation unit is configured to calculate, for respective character strings, a variance of feature amounts of the tags which are assigned to the character strings in a markup text. The detection unit is configured to detect first character string assigned first tag having the variance not less than a first threshold value as a first candidate including the tag to be corrected. The presentation unit is configured to present the first candidate.

A markup assistance apparatus, method and program according to this embodiment will be described hereinafter with reference to the drawings. Note that parts denoted by the same reference numerals perform the same operations, and a repetitive description thereof will be avoided as needed.

A use example of a markup assistance system using a markup assistance apparatus according to this embodiment will be described below with reference to FIG. 1.

FIG. 1 illustrates an electronic book (e-book) reading service system provided as an example of a markup assistance system.

A markup assistance system 100 includes a management server 101, and user terminals A102-1, B102-2, and C102-3.

The management server 101 assigns tags to sentences of an e-book 151 to generate a markup document 152 (to be referred to as markup text data item 152 hereinafter). As tags, <angry> and <fear> tags are used in the example of FIG. 1, and they mean that sentences enclosed by the tags are read out with emotions of "anger" and "fear". Note that tagged text data item will be referred to as markup text data item hereinafter.

Each of the user terminals A102-1 to C102-3 transmits a request signal to the management server 101 to download the markup text data item 152. The management server 101 receives the request signal, and delivers the markup text data item to the user terminals 102 that have transmitted the request signal.

The user can control to read the received markup text data item based on tags assigned by automatic estimation. However, tags assigned by the automatic estimation include many errors, and, one may be dissatisfied with tags which are assigned by another user since they are disagreeable to his or her preferences. Hence, the user may correct the disagreeable tags according to his or her subjective view and preference to generate corrected markup text data item 153. More specifically, the user terminal A102-1 changes a <fear> tag assigned by the management server 101 to an <excited> tag, and the user terminal C102-3 changes an <angry> tag to a <shame> tag.

The corrected markup text data item 153 is transmitted from the user terminal 102 to the management server 101, and is shared by other users. In this case, "sharing" means to allow users to browse and download the markup text data item which is marked up by another user, and also means that the markup text data item is used as base data upon assigning tags and upon presenting a correction candidate of markup processing.

A markup assistance apparatus according to this embodiment will be described below with reference to the block diagram shown in FIG. 2.

A markup assistance apparatus 200 according to this embodiment includes a shared markup text storage 201, markup text sharing unit 202, tag storage 203, tag assignment unit 204, feature amount acquisition unit 205, markup text conversion unit 206, correction candidate detection unit 207, tag variance calculation unit 208, tag candidate calculation unit 209, and correction information display 210.

The shared markup text storage 201 stores markup text data item generated by assigning default tags to text data item, and those, tags of which are assigned and corrected by users in association with book IDs. The default tags are those which are automatically assigned first by the markup assistance apparatus 200 to text data item. A book ID is, for example, a numerical value uniquely given to a book title. Markup text data item stored in the shared markup text storage 201 will also be referred to as shared markup text data item hereinafter. The shared markup text data item will be described later with reference to FIG. 3.

The markup text sharing unit 202 manages markup text data item. For example, the markup text sharing unit 202 extracts markup text data item stored in the shared markup text storage 201 so as to assign new tags, and stores new markup text data item in the shared markup text storage 201.

The tag storage 203 stores a plurality of types of tags to be assigned to text data item. For example, tags which are defined by SSML, that is, those which control a pitch, speech rate, and volume, and those which designate an emotion, utterance style, and speaker are stored. Note that in this embodiment, types of tags are not particularly limited as long as a condition that an inter-tag distance (also referred to as an inter-tag similarity or first similarity) can be defined is satisfied. This embodiment will exemplify emotion tags below.

The tag assignment unit 204 receives shared markup text data item via the markup text sharing unit 202, and receives tags from the tag storage 203. The tag assignment unit 204 assigns tags to text data item with reference to the shared markup text data item.

The feature amount acquisition unit 205 receives tags from the tag storage 203, and acquires feature amounts used to define inter-tag distances (inter-tag similarity) corresponding to tags for respective tags. The feature amounts are, for example, multidimensional vectors. A distance between multidimensional vectors can be defined by Euclidian distance or cosine distance. Note that as the feature amounts for respective tags, the feature amount acquisition unit 205 may possess a table which defines the relationship between tags and feature amounts in advance, and may refer to that table as needed. Alternatively, the feature amount acquisition unit 205 may refer to an external table as needed. Also, the feature amount acquisition unit 205 may calculate feature amounts using a certain function.

The markup text conversion unit 206 respectively receives markup text data item from the tag assignment unit 204 and feature amounts from the feature amount acquisition unit 205, and converts the markup text data item into feature amount time-series data item by replacing respective tags in the markup text data item by the feature amounts. Since the markup text conversion unit 206 converts the markup text data item into time-series data item, variances of tags and inter-user distances (also referred to as second similarity) can be defined in consideration of inter-tag distances.

The correction candidate detection unit 207 respectively receives feature amount time-series data item from the markup text conversion unit 206, markup text data item from the markup text sharing unit 202, and variances of tags from the tag variance calculation unit 208 (to be described later). The correction candidate detection unit 207 extracts a part where the user is more likely to correct a tag as a correction candidate based on the feature amount time-series data item.

The tag variance calculation unit 208 receives the feature amount time-series data item from the correction candidate detection unit 207, and calculates variances of tags.

The tag candidate calculation unit 209 receives the markup text data item, feature amount time-series data item, and correction candidate from the correction candidate detection unit 207, calculates a tag to be replaced in the correction candidate, and selects a tag candidate indicating a new tag candidate.

The correction information display 210 receives a candidate tag and markup text data item from the tag candidate calculation unit 209, and presents which part of a tag of text data item is to be corrected and which tag is to be assigned to the user.

An example of shared markup text data item stored in the shared markup text storage 201 will be described below with reference to FIG. 3.

As shown in FIG. 3, text data item is divided into sentences, and sentence IDs 301, default tags 302, user tags 303, and sentences 304 are stored in a table as shared markup text data item in association with each other. In this case, the default tags 302 assigned as a result of automatic estimation by machine learning and the user tags 303 obtained when users A to C assign their favorite tags to the respective sentence IDs 301 are associated with the sentences 304. The default tags 302 may be handled as one user. More specifically, to a sentence 304 [Are you kidding?] of a sentence ID 301 "7", "anger" is assigned as the default tag 302, "happy", "shame", and "anger" are respectively assigned by users A, B, and C as the user tags 303. Upon reading, each sentence is read with an emotion of the assigned tag.

Note that text data item of an e-book and tags may be independently managed. A sentence is used as a markup basic unit. However, markup processing may be executed using another unit such as characters, words, paragraphs, or the like as a reference.

From only the sentence [Are you kidding?] of the sentence ID "7", "anger" is more likely to be felt as an emotion in that sentence. However, since this sentence is an answer to praise in the previous sentence (sentence ID "6" [You'll pass the entrance exam on your first try because you're smart.]), other interpretations such as "happy" and "shame" are assumed, and some users (users A and B) mark up this sentence as in other interpretations. In this manner, tags such as emotion tags cannot be uniquely decided, and various interpretations are available depending on subjective views and preferences of users. Furthermore, other tags (pitch, speech rate, volume, utterance style, speaker, and the like) used in the text-to-speech processing have similar properties.

Figure 4:
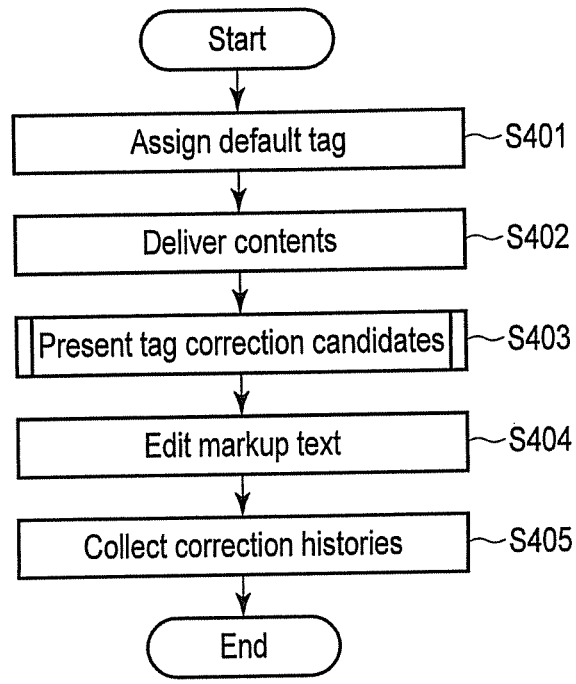
FIG. 4 is a flowchart illustrating the operation of a markup assistance system.

The operation of the markup assistance system using the markup assistance apparatus will be described below with reference to the flowchart illustrated in FIG. 4.

Assume that the shared markup text storage 201, markup text sharing unit 202, tag storage 203, and tag assignment unit 204 are included in the management server 101 shown in FIG. 1. Also, assume that the feature amount acquisition unit 205, markup text conversion unit 206, correction candidate detection unit 207, tag variance calculation unit 208, tag candidate calculation unit 209, and correction information display 210 are included in each user terminal 102 shown in FIG. 1. Note that the respective units and storages included in the markup assistance apparatus 200 may be included in either the management server 101 or each user terminal 102.

In step S401, the tag assignment unit 204 assigns default tags to text data item. As the default tag assignment technique, for example, a technique by means of automatic estimation using existing machine learning, a technique of assigning tags of maximum numbers from shared markup text data item, and a technique of assigning tags which are most confirmed by other users from shared markup text data item can be used.

In step S402, the management server 101 delivers the markup text data item assigned with the default tags to the user terminals 102.

In step S403, in the user terminal 102, the correction candidate detection unit 207 detects correction candidates as sentences whose tags are to be corrected from the markup text data item, and the tag candidate calculation unit 209 calculates tag candidates upon correcting tags. After that, the correction information display 210 displays the correction candidates and tag candidates to the user.

In step S404, the user edits tags (for example, he or she adds tags to the correction candidates or corrects tags in the correction candidates) with reference to the correction candidates and tag candidates.

In step S405, the user terminal 102 sends the markup text data item in which tags are added or corrected to the management server 101. The management server 101 collects the corrected markup text data item sent from the user terminals 102, and stores them in the shared markup text storage 201. When a large number of users edit (add and correct) tags of the markup text data item, the assignment precision of default tags using the shared markup text data item can be improved. When the assignment precision of default tags is improved, the number of portions where users correct tags is decreased, thus allowing more efficient markup processing.

Figure 5:
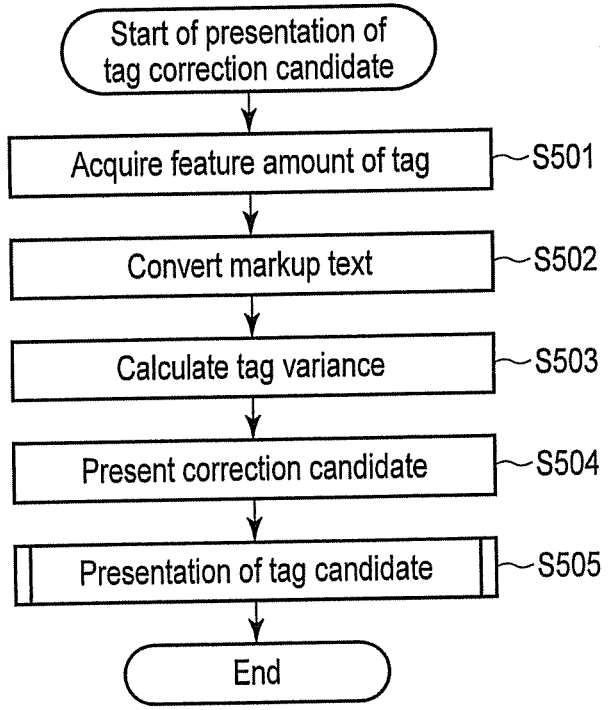
FIG. 5 is a flowchart illustrating presentation processing of a correction candidate and tag candidate.

The tag candidate presentation processing in step S403 will be described below with reference to the flowchart illustrated in FIG. 5.

In step S501, the feature amount acquisition unit 205 acquires feature amounts for respective tags in the shared markup text data item.

In step S502, the markup text conversion unit 206 converts the tags of the shared markup text data item into the feature amounts defined in step S501, thus obtaining feature amount time-series data item.

In step S503, the tag variance calculation unit 208 calculates variances for respective tag assignment basic units. Note that the present embodiment is not limited to variances if variation degrees of tags assigned by the users can be defined. In this case, "variance" is used as term which means variations as well as values which are equivalent to variances.

In step S504, the correction candidate detection unit 207 detects a tag whose variance is not less than a threshold as a correction candidate which is more likely to be corrected, and the correction information display 210 displays the correction candidates.

In step S505, the tag candidate calculation unit 209 decides a tag candidate to be presented for each correction candidate, and the correction information display 210 presents the tag candidates to the user.

The feature amount acquisition processing in the feature amount acquisition unit 205 in step S501 will be described below with reference to FIGS. 6A and 6B.

Figures 6A, 6B:
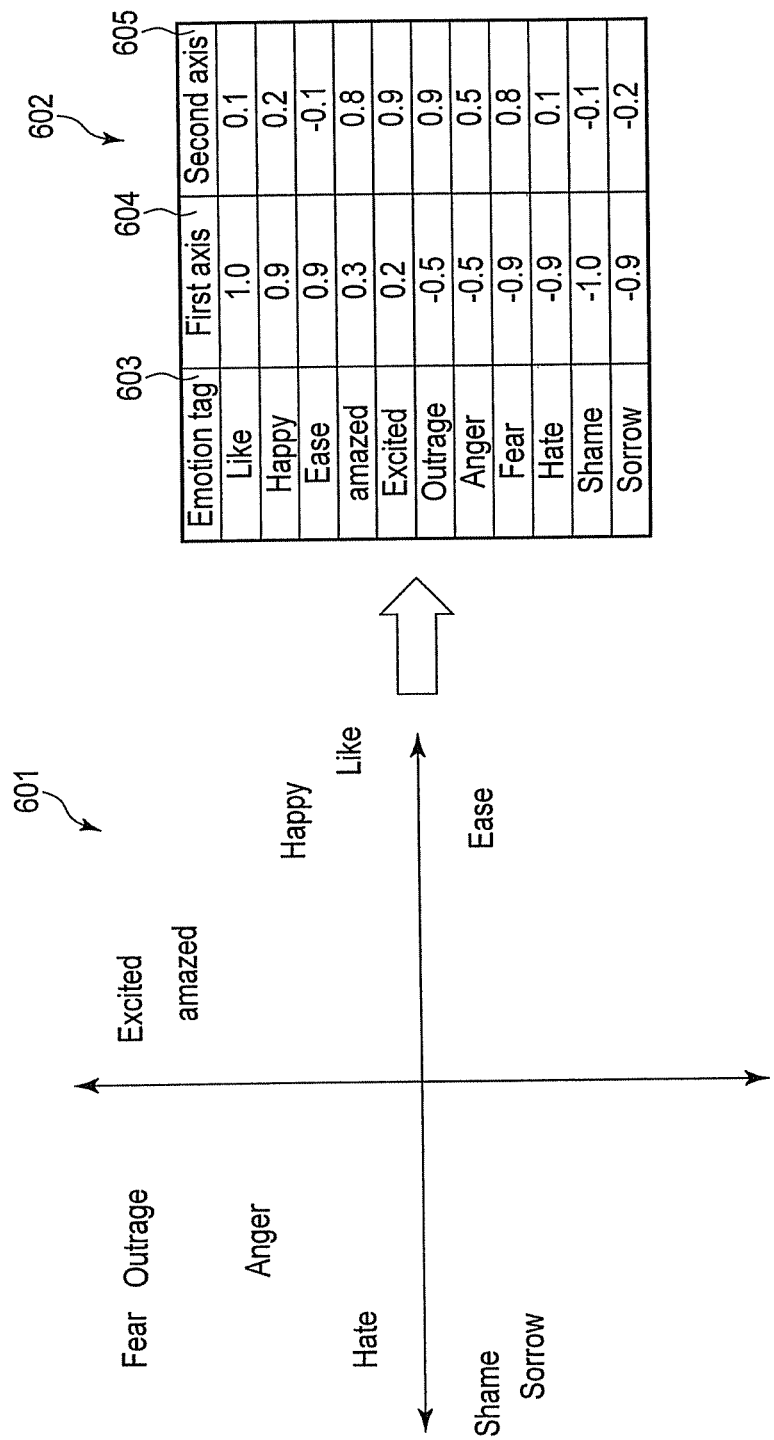
FIG. 6A illustrates a conceptual view of inter-tag distances.
FIG. 6B illustrates a table of tags and corresponding feature amounts.

FIG. 6A illustrates a conceptual view of inter-tag distances and FIG. 6B illustrates a table indicating tags and corresponding coordinate values.

A feature of a tag which is more likely to be corrected will be described below. Assume that a shared markup text set shown in FIG. 3 is given. When all users assign quite the same tag "ease", or when the default tag remains unchanged and has no variation as in the sentence ID "1", this tag has high reliability, and is unlikely to be corrected by a new user. On the other hand, when the users assign various tags like in the sentence ID "7", it is considered that different tags are assigned depending on subjective views and preferences of the users. The tag of the sentence with a large variety of tags is more likely to be corrected by a new user. However, although different tags are assigned like in sentence IDs "22" and "23", when they express emotions having high similarities (for example, "like" and "ease", and "happy" and "like"), reading effects with emotions are relatively close to each other, and these tags are unlikely to be corrected by a new user.

As described above, since tags corresponding to largely different reading effects and large variations are more likely to be corrected, they are presented as correction candidates to the user. When the assigned tags have no variations, or when various tags having closer reading effects are assigned, such tags are unlikely to be corrected, and are not presented as correction candidates to the user. In this manner, by narrowing down correction candidates, the markup correction efficiency by the user can be greatly enhanced.

In FIG. 6A illustrates an example in which tags are laid out on a two-dimensional coordinate plane 601. "Like", "ease", "happy", "anger", "shame", and the like are respectively emotion tags. In case of the arrangement, tags having similar reading effects are laid out at closer positions. For example, FIG. 6A means that "like" and "ease" have a small distance (a high similarity), but "like" and "angry" have a large distance (a low similarity). When the tags are laid out in this way, they are expressed as feature amounts of two-dimensional vectors, and an inter-tag distance can be calculated as, for example, Euclidian distance.

FIGS. 6A and 6B illustrate an example of only emotion tags. However, arbitrary tags such as pitches, speech rates, volumes, utterance styles, speakers, and the like may be used. For example, in case of speakers, "male voice" and "female voice" may have a large distance (a low similarity), and an inter-tag distance may be defined by, for example, a method of calculating a distance by comparing voice spectra. In this embodiment, the inter-tag distance definition is fixed in advance. Alternatively, an interface which allows the user to freely change the tag arrangement on the two-dimensional coordinate plane 601 and distance definition may be prepared. For example, the user may input instruction signals to the feature amount acquisition unit 205 via the interface, and the feature amount acquisition unit 205 may change the tag arrangement and distance definition according to the instruction signals. Furthermore, the feature amounts are expressed by two-dimensional vectors, but the feature amounts are not particularly limited as long as inter-tag distances can be defined.

FIG. 6B illustrates a table 602 which associates coordinate values of first and second axes 604 and 605 with emotion tags 603 with reference to an origin. In this case, the first axis (horizontal axis) 604 represents the magnitude of a degree of happiness, and the second axis (vertical axis) 605 represents that of a degree of arousal, but meanings need not be assigned to the respective axes.

An example of the shared markup text data item in which tags are replaced by feature amounts will be described below with reference to FIG. 7.

In a table of the shared markup text data item illustrated in FIG. 7, the tags of the shared markup text data item illustrated in FIG. 3 are converted into feature amounts 701, and variances 702 of the feature amounts are respectively added in association with them. More specifically, a feature amount 701 [(−0.5, 0.5)] of the default tag 302 of the sentence ID 301 "7", feature amounts [(0.9, 0.2)], [(−1.0, −0.1)], and [−0.5, 0.5)] of user tags respectively assigned by users A, B, and C, a variance 702 [0.75], and the sentence 304 [Are you kidding?] are associated with each other. In this manner, the markup text data item can be expressed as feature amount time-series data item.

The variance calculation method of the tag variance calculation unit 208 in step S503 will be described below.

In tag variance calculations, in this embodiment, variances are calculated for respective dimensions of a feature amount in FIG. 7, and are then added up. For example, a variance of the sentence of the sentence ID "7" can be calculated like equation (1):

$$A = \begin{pmatrix} -0.5 & 0.5 \\ 0.9 & 0.2 \\ -1.0 & -0.1 \\ -0.5 & 0.5 \end{pmatrix} \quad (1)$$

When assigned tags are expressed by a matrix of feature amounts, we have:

variance=sum(diag(cov($A$)))

where sum( ) is a function of calculating a sum, diag( ) is a function of acquiring diagonal components, and cov( ) is a function of calculating a variance-covariance matrix. Using the same method, variances are calculated for feature amounts associated with all sentences.

The detection processing of the correction candidate detection unit 207 in step S504 will be described below with reference to FIG. 8.

Figure 8:
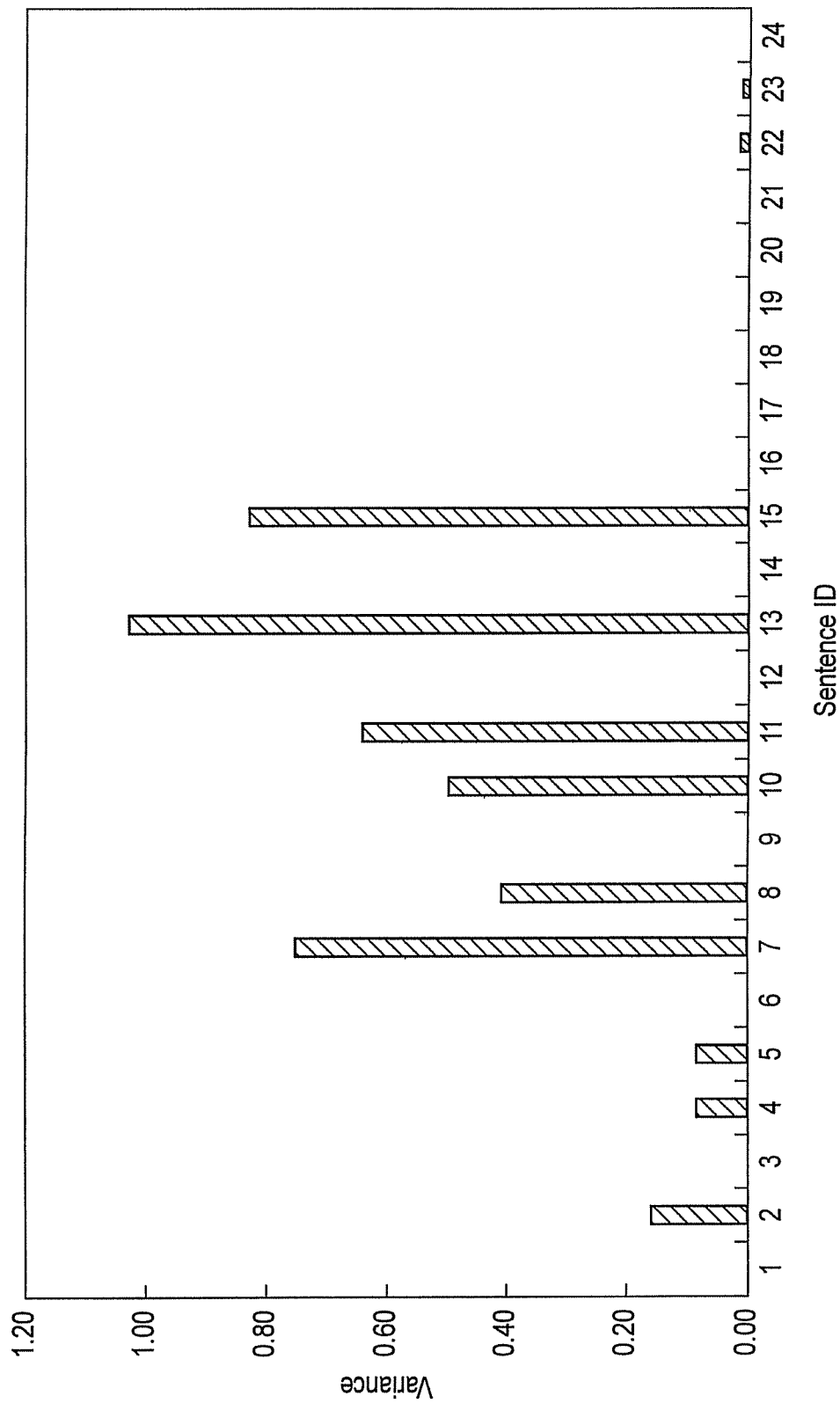
FIG. 8 is a graph illustrating an example of variances for respective sentence IDs.

FIG. 8 is a graph illustrating variances for respective sentence IDs in which the horizontal axis plots the sentence IDs 301 and the vertical axis plots the variances 702 in association with the items of the sentence IDs 301 and variances 702 in FIG. 7. From this graph, large tag variations and small tag variations can be recognized. Note that since the variance value is calculated also in consideration of an inter-tag distance, a variance between tags having similar reading effects is small. The correction candidate detection unit 207 selects a sentence whose variance is not less than a threshold as a correction candidate.

More specifically, when tags having largely different reading effects like "anger", "happy", and "shame" are assigned like the sentence ID "7", that is, when inter-tag distances are large (low similarities), a variance assumes a large value. On the other hand, when all users assign the same tag "ease" like the sentence ID "1", and when assigned tags are different but they have similar reading effects like "like", "ease", and "happy" in the sentence IDs "22" and "23", that is, when inter-tag distances are small (high similarities), a variance assumes a small value. Hence, when a variance is large, a correction candidate is selected based on that variance for each sentence ID as a position which is to prompt the user to be corrected due to different tags assigned depending on subjective views and preferences of users.

Note that the threshold may assume a predetermined value or a value that can be changed by the user. A method of selecting the predetermined number of sentences as correction candidates in descending order of variance may be used.

A display example of the correction information display 210 in step S604 will be described below with reference to FIG. 9.

Figure 9:
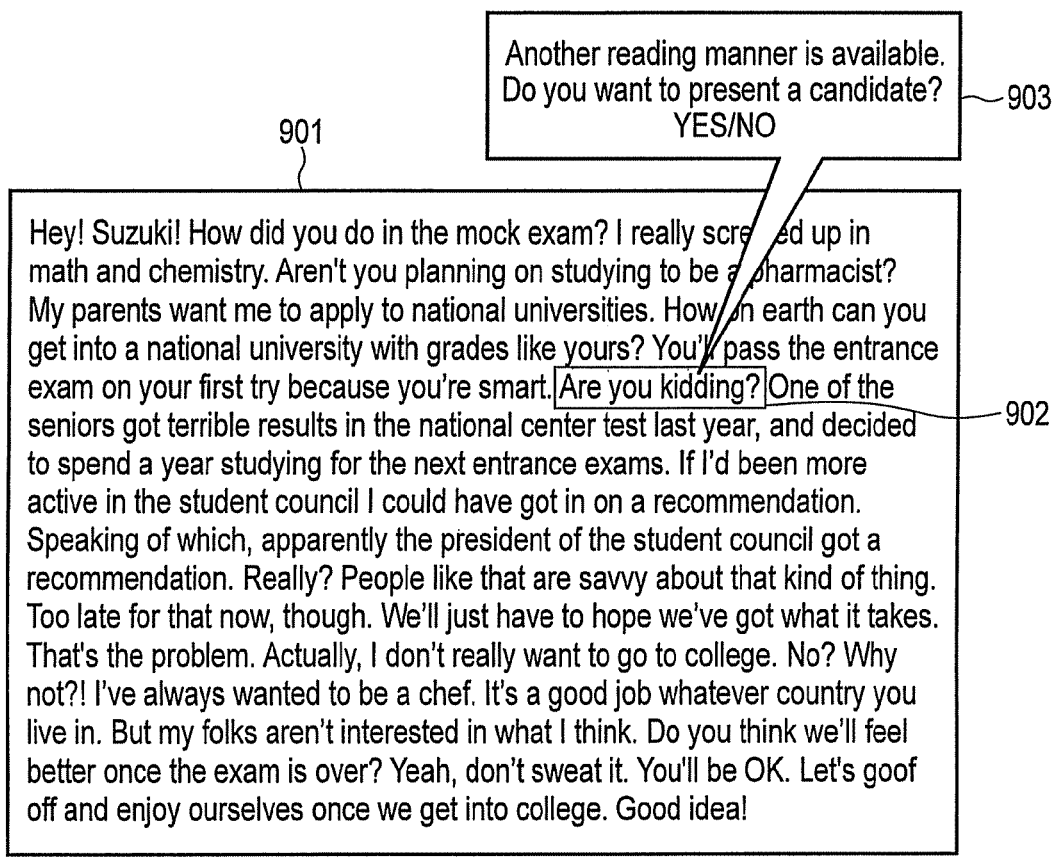
FIG. 9 is a view illustrating the first display example of a correction information presentation unit.

FIG. 9 illustrates an example of a user interface used to display a correction candidate. A case will be assumed wherein the user is listening to a reading voice associated with text 901 while reading the text 901.

When a correction candidate is found during reading, a popup 903 is displayed by highlighting the correction candidate, thus presenting the presence of another reading candidate to the user. More specifically, a correction candidate 902 (sentence ID "7" [Are you kidding?]) whose variance is not less than the threshold as a result of the calculation in the tag variance calculation unit 208 is highlighted, thus prompting the user to select another candidate by displaying [Another reading manner is available. Do you want to present a candidate?] as the popup 903. As another method, correction candidates may be displayed as a list before reading, and the user may correct tags at once in advance. Note that FIG. 9 illustrates a display example in which the correction candidate is displayed as the popup. Alternatively, the correction candidate may be displayed on an independent window, and any other methods may be adopted as long as the user can recognize the correction candidate.

Figure 10:
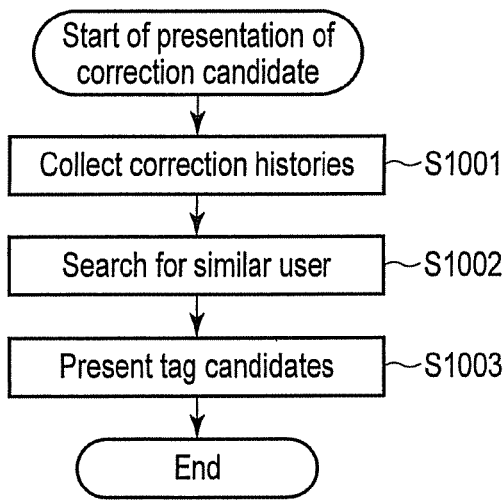
FIG. 10 is a flowchart illustrating tag candidate presentation processing.

The tag candidate presentation processing in step S505 will be described in more detail below with reference to the flowchart shown in FIG. 10. A case will be assumed below wherein a new user creates unique markup text data item while the markup text data item of the four users including the default tags are registered or shared, as shown in FIG. 7.

In step S1001, the tag candidate calculation unit 209 collects information items of correction candidates and tags, which were corrected so far by all the users, from the shared markup text data item stored in the shared markup text storage 201.

In step S1002, the tag candidate calculation unit 209 searches for a user who corrected tags to have a similar tendency as the new user based on a similarity with the new user. In this case, as an example of similarity calculations with the new user, inter-user distances are calculated in the same manner as inter-tag distances. Initially, Euclidian distances between tags are calculated for respective sentences, and the Euclidian distances calculated for all the sentences are added. A user for which the sum is not more than a threshold may be selected as a user who has a high similarity to the new user. A practical example will be described later with reference to FIG. 12.

In step S1003, tag candidates are presented to the new user based on tags which were assigned by the user who has the high similarity to the new user.

An example of the shared markup text data item when a new user assigns tags will be described below with reference to FIG. 11.

In a table shown in FIG. 11, a column of tags of a new user 1101 is added to the table illustrated in FIG. 7, and this table is stored in the shared markup text storage 201. The new user has already assigned tags to the sentences of the sentence IDs "7", "8", "10", "11", and "13" as correction candidates 1102 which were corrected by himself or herself, and assigns a tag to the sentence of the sentence ID "15" as a next correction candidate 1103.

The tag candidate calculation unit 209 collects five feature amounts (0.9, 0.2), (0.2, 0.9), (−0.9, 0.1), (−0.9, 0.1), and (−0.9, 0.8) of tags of the sentences of the sentence IDs "7", "8", "10", "11", and "13", to which sentences the new user assigned tags, as information items of the correction candidates and tags which were corrected by the new user so far.

The inter-user distance calculation method in step S1002 will be described below with reference to FIG. 12.

Figures 12, 13:
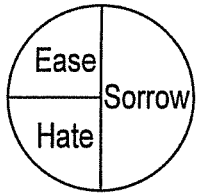
FIG. 12 is a table illustrating an example of inter-user distance calculation processing by a tag candidate calculation unit.
FIG. 13 is a view illustrating the second display example of the correction information presentation unit.

FIG. 12 illustrates a table prepared by extracting feature amounts of tags of the sentence IDs, which were corrected by the new user, and those of default tags and tags assigned by users A to C of the same sentence IDs. Based on the sentence IDs of the aforementioned five correction candidates, distances from the new user are calculated. More specifically, Euclidian distance 1201 between the new user and user B is expressed by:

$$\sqrt{(0.9-(-1.0))^2+(0.2-(-0.1))^2} + \\ \sqrt{(0.2-0.2)^2+(0.9-0.9)^2} + \sqrt{(-0.9-0.9)^2+(0.1-(-0.1))^2} + \\ \sqrt{(-0.9-0.3)^2+(0.1-0.8)^2} + \\ \sqrt{(-0.9-(-0.9))^2+(0.8-0.1)^2} = 5.823859833 \quad (2)$$

When the Euclidian distances 1201 between the new user 1101 and other users are calculated by the same method, a distance (7.75) from the default tags, distance (1.36) from user A, distance (5.82) from user B, and distance (3.90) from user C are obtained, as illustrated in FIG. 12.

Hence, the markup of users A, C, and B, and the default tags in descending order have higher markup similarities with the new user 1101 in terms of a distance from the new user 1101. That is, it is determined that user A has a closest markup tendency with the new user 1101, and has subjective views and preferences similar to the new user 1101.

Note that in the aforementioned example, distances are calculated while limiting to sentences, tags of which were corrected by the new user. Alternatively, inter-user distances may be calculated based on all sentences in the markup text data item. The inter-user distances calculated by this method reflect inter-tag distances.

A presentation example of a tag candidate by the correction information display 210 will be described below with reference to FIG. 13.

As a tag candidate presentation method, for example, tags assigned by the user who has the closest distance to the new user in corresponding sentences are presented intact with reference to the markup text data item of that user. More specifically, since user A has the closest distance to the new user in FIG. 12, "sorrow" (feature amounts: −0.9, −0.2) is presented as a tag candidate to be assigned to the sentence ID "15" of the new user. Also, as illustrated in FIG. 13, ratios of assigned tags may be displayed using a popup 1301. Furthermore, the predetermined number of users having closer distances to the new user may be selected in turn, and tags of the maximum numbers of those which are assigned most to a document may be presented, or may be displayed in turn as a ranking.

When there are a plurality of tag candidates, tags may be merged to generate a new tag. For example, upon presenting tag candidates by means of the popup 1301 illustrated in FIG. 13, when "happy" and "sorrow" are respectively presented at a ratio of 50%, they may express an emotion "weeping for joy" captured by the user as both "happy" and "sorrow". In this case, reading can be done by merging two emotions "happy" and "sorrow" at respective ratios (in this case, 50%) using a technique such as emotion morphing.

When the inter-user distances are defined by the aforementioned method, a user who improperly marked up text data item (for example, by randomly marking up text data item irrespective of subjects) can be detected. Using a multidimensional scaling method which maps users on a two-dimensional plane while maintaining distances, a user who improperly marked up text data item is mapped at an outlier position. The user who is mapped at the outlier position is excluded from correction candidates and tag candidate calculation targets, thus more improving the markup efficiency and inter-user distance precision, and allowing to take appropriate measures.

The hardware arrangement of the management server and user terminal according to this embodiment will be described below with reference to the block diagram illustrated in FIG. 14.

FIG. 14 is a block diagram illustrating the hardware arrangement of the management server 101 and user terminal 102 of this embodiment. Each of the management server 101 and user terminal 102 includes a central processing unit (CPU) 1401, read-only memory (ROM) 1402, random access memory (RAM) 1403, hard disk drive (HDD) 1404, display 1405, transceiver unit 1406, and operation unit 1407, which are connected to each other via a bus 1408.

The CPU 1401 is a processing device which controls the overall processing of the markup assistance apparatus 200.

The ROM 1402 stores programs and the like, which implement various processes to be executed by the CPU. For example, the units illustrated in FIG. 2 are stored in the ROM as programs.

The RAM 1403 stores data required for various processes to be executed by the CPU.

The HDD 1404 stores large-size data such as text data item of e-books, shared markup text data item, tags, and the like.

The display 1405 displays text data item, tag candidates, and the like.

The transceiver unit 1406 transmits and receives e-books and markup text data, items.

The operation unit 1407 allows the user to input instructions with respect to presented information.

Note that programs executed by the markup assistance apparatus of this embodiment have a unit configuration including the aforementioned units (markup text sharing unit 202, tag assignment unit 204, feature amount acquisition unit 205, markup text conversion unit 206, correction candidate detection unit 207, tag variance calculation unit 208, tag candidate calculation unit 209, and correction information display 210). As actual hardware, when the CPU 1401 reads out various programs from the ROM 1402 and executes the readout programs, the aforementioned units are loaded onto the RAM 1403, thus generating the aforementioned function on the RAM 1403.

This embodiment adopts the server-client configuration. In this configuration, the units illustrated in FIG. 2 may be executed by either the server or client. Furthermore, this embodiment has exemplified e-books as text data items and emotion tags as tags. However, the present embodiment is not limited to this, and may be applied to general text data item and arbitrary tags which allow to define distances.

According to the markup assistance apparatus of the present embodiment, since positions where the user is to correct tags are presented based on inter-tag similarities with respect to large-size text data item such as an e-book, candidates to be corrected can be narrowed down, thus greatly improving markup processing efficiency. Also, even when tags such as emotion tags fluctuate depending on subjective views and preferences of users, a certain user can refer to tags of a user who has similar markup tendency to himself or herself, thus allowing efficient markup processing.

The flowcharts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A markup assistance apparatus comprising:
an acquisition unit configured to acquire a feature amount for respective tags, each of the tags being used to control text-to-speech processing of a shared markup text, the shared markup text including character strings assigned with the tags, at least one of the tags being different from other tags, the feature amount being a value used to define a first similarity which indicates a degree of similarity between tags;
a first calculation unit configured to calculate, for respective character strings, a variance of feature amounts of the tags which are assigned to the character strings in the shared markup text;
a detection unit configured to detect a first character string assigned with a first tag having the variance not less than a first threshold value as a first candidate including the tag to be corrected; and
a presentation unit configured to present the first candidate.

2. The apparatus according to claim 1, further comprising a second calculation unit configured to calculate, based on the feature amounts of tags assigned to each character string by respective users, a second similarity which indicates a degree of similarity between the users, and to select a second candidate based on tags assigned by first user whose the second similarity is not less than a second threshold value, the second candidate indicating a candidate of tag to be assigned to the first candidate,
wherein the presentation unit further presents the second candidate.

3. The apparatus according to claim 2, wherein the presentation unit presents the second candidate and the first candidate in association with each other.

4. The apparatus according to claim 2, wherein the second calculation unit generates a new tag by merging a plurality of second candidates.

5. The apparatus according to claim 1, further comprising a tag assignment unit configured to assign the tags to the character strings based on the markup text edited by at least one of the users.

6. The apparatus according to claim 1, wherein the acquisition unit changes the first similarity according to an instruction signal.

7. A markup assistance method comprising:
acquiring a feature amount for respective tags, each of the tags being used to control text-to-speech processing of a shared markup text, the shared markup text including character strings assigned with the tags, at least one of the tags being different from other tags, the feature amount being a value used to define a first similarity which indicates a degree of similarity between tags;
calculating, for respective character strings, a variance of feature amounts of the tags which are assigned to the character strings in the shared markup text;
detecting a first character string assigned with a first tag having the variance not less than a first threshold value as a first candidate including the tag to be corrected; and
presenting the first candidate.

8. The method according to claim 7, further comprising calculating, based on the feature amounts of tags assigned to each character string by respective users, a second similarity which indicates a degree of similarity between the users, and to select a second candidate based on tags assigned by first user whose the second similarity is not less than a second threshold value, the second candidate indicating a candidate of tag to be assigned to the first candidate, wherein the presenting the first candidate further presents the second candidate.

9. The method according to claim 8, wherein the presenting the first candidate presents the second candidate and the first candidate in association with each other.

10. The method according to claim 8, wherein the calculating the second similarity generates a new tag by merging a plurality of second candidates.

11. The method according to claim 7, further comprising assigning the tags to the character strings based on the markup text edited by at least one of the users.

12. The method according to claim 7, wherein the acquiring the feature amount changes the first similarity according to an instruction signal.

13. A non-transitory computer readable medium including computer executable instructions, wherein the instructions, when executed by a processor, cause the processor to perform a method comprising:

acquiring a feature amount for respective tags, each of the tags being used to control text-to-speech processing of a shared markup text, the shared markup text including character strings assigned with the tags, at least one of the tags being different from other tags, the feature amount being a value used to define a first similarity which indicates a degree of similarity between tags;

calculating, for respective character strings, a variance of feature amounts of the tags which are assigned to the character strings in the shared markup text;

detecting a first character string assigned with a first tag having the variance not less than a first threshold value as a first candidate including the tag to be corrected; and presenting the first candidate.

14. The computer readable medium according to claim 13, further comprising calculating, based on the feature amounts of tags assigned to each character string by respective users, a second similarity which indicates a degree of similarity between the users, and to select a second candidate based on tags assigned by first user whose the second similarity is not less than a second threshold value, the second candidate indicating a candidate of tag to be assigned to the first candidate, wherein the presenting the first candidate further presents the second candidate.

15. The computer readable medium according to claim 14, wherein the presenting the first candidate presents the second candidate and the first candidate in association with each other.

16. The computer readable medium according to claim 14, wherein the calculating the second similarity generates a new tag by merging a plurality of second candidates.

17. The computer readable medium according to claim 13, further comprising assigning the tags to the character strings based on the markup text edited by at least one of the users.

18. The computer readable medium according to claim 13, wherein the acquiring the feature amount changes the first similarity according to an instruction signal.

\* \* \* \* \*